United States Patent [19]

Kane et al.

[11] Patent Number: 5,736,619
[45] Date of Patent: Apr. 7, 1998

[54] PHENOLIC RESIN COMPOSITIONS WITH IMPROVED IMPACT RESISTANCE

[75] Inventors: John F. Kane, Woodland Hills; Norman R. Mowrer, La Habra, both of Calif.

[73] Assignee: Ameron International Corporation, Pasadena, Calif.

[21] Appl. No.: 426,245

[22] Filed: Apr. 21, 1995

[51] Int. Cl.$^6$ .................................................. C08L 83/02
[52] U.S. Cl. .......................... 525/393; 525/903; 525/474; 525/398
[58] Field of Search ............................ 525/903, 474, 525/393, 398

[56] References Cited

U.S. PATENT DOCUMENTS

| | | | |
|---|---|---|---|
| 2,718,507 | 9/1955 | Rauner | 260/19 |
| 2,894,931 | 7/1959 | Somerville et al. | 260/43 |
| 2,920,058 | 1/1960 | Brown | 260/43 |
| 2,927,910 | 3/1960 | Cooper | 260/43 |
| 3,074,903 | 1/1963 | Fincke et al. | 260/43 |
| 3,482,007 | 12/1969 | Routh | 264/71 |
| 3,593,391 | 7/1971 | Routh | 25/38 |
| 3,761,209 | 9/1973 | Hanton | 425/4 |
| 3,911,045 | 10/1975 | Hartmann et al. | 260/826 |
| 3,914,463 | 10/1975 | Mercurio et al. | 427/54 |
| 3,980,729 | 9/1976 | Yokokawa et al. | 260/826 |
| 4,022,753 | 5/1977 | Lohse et al. | 260/46.5 |
| 4,133,931 | 1/1979 | Beale et al. | 428/315 |
| 4,190,686 | 2/1980 | Muis | 427/317 |
| 4,250,074 | 2/1981 | Foscante et al. | 525/903 |
| 4,302,553 | 11/1981 | Frisch et al. | 525/28 |
| 4,368,294 | 1/1983 | Deubzer et al. | 525/100 |
| 4,417,006 | 11/1983 | Graziano et al. | 523/435 |
| 4,465,804 | 8/1984 | Sorensen | 524/505 |
| 4,468,499 | 8/1984 | Siegfried et al. | 525/301 |
| 4,551,486 | 11/1985 | Tateosian et al. | 523/212 |
| 4,558,089 | 12/1985 | Koyama et al. | 524/509 |
| 4,565,846 | 1/1986 | Saito et al. | 525/101 |
| 4,631,322 | 12/1986 | Isayama et al. | 525/480 |
| 4,657,951 | 4/1987 | Takarada et al. | 523/153 |
| 4,695,602 | 9/1987 | Crosby et al. | 524/439 |
| 4,702,515 | 10/1987 | Kato et al. | 296/189 |
| 4,764,560 | 8/1988 | Mitchell | 525/506 |
| 4,766,183 | 8/1988 | Rizk et al. | 525/454 |
| 4,845,162 | 7/1989 | Schmitt et al. | 525/423 |
| 4,849,469 | 7/1989 | Crosby et al. | 524/439 |
| 4,918,132 | 4/1990 | Hongo et al. | 524/504 |
| 4,942,207 | 7/1990 | Lee et al. | 525/476 |
| 5,011,887 | 4/1991 | Sasaki et al. | 525/63 |
| 5,041,474 | 8/1991 | Kim et al. | 523/435 |
| 5,132,349 | 7/1992 | Iimuro et al. | 324/265 |
| 5,143,951 | 9/1992 | Ohta et al. | 523/435 |
| 5,157,058 | 10/1992 | Dillion et al. | 521/134 |
| 5,177,157 | 1/1993 | Akamatsu | 525/398 |
| 5,219,932 | 6/1993 | Yamamoto et al. | 525/63 |
| 5,286,574 | 2/1994 | Foster | 428/457 |
| 5,378,789 | 1/1995 | Raleigh et al. | 528/29 |

*Primary Examiner*—Margaret W. Glass
*Attorney, Agent, or Firm*—Christie, Parker & Hale, LLP

[57] ABSTRACT

Phenolic siloxane compositions are prepared in a first embodiment by combining phenol with an aldehyde and an alkoxy or silanol-functional silicone intermediate; in a second embodiment by combining a phenolic novolac resin with a formaldehyde donor and an alkoxy or silanol-functional silicone intermediate; and in a third embodiment by combining a phenolic resole resin with an alkoxy or silanol-functional silicone intermediate. Optionally, a catalyst to facilitate formation of a phenolic resin from phenol and formaldehyde can be added, a catalyst to facilitate condensation of the phenolic resin can be added, and at least one catalyst to facilitate hydrolysis and/or condensation of the silicone intermediate can be added. The phenolic resin catalyst can include acids, bases, and formaldehyde donors. The silicone intermediate catalyst can include organometallic compounds, amine compounds, and mixtures thereof. The ingredients react to form a phenolic siloxane composition comprising an IPN of siloxane and phenolic polymers, and having siloxane groups in the phenolic polymer. The phenolic siloxane composition has flame, heat and chemical resistance equal to or exceeding conventional phenolic resins, and has improved properties of impact resistance, tensile strength, flexural modulus, and density when compared to conventional non-siloxane phenolic siloxane compositions.

50 Claims, 2 Drawing Sheets

PHENOLIC RESIN COMPOSITIONS WITH IMPROVED IMPACT RESISTANCE

FIELD OF THE INVENTION

The present invention relates generally to phenolic resin compositions useful in providing fire resistance, along with low smoke emission and low smoke toxicity, heat resistance, chemical resistance, and good abrasion and wear resistance in numerous applications. More particularly, the present invention relates to phenolic compositions modified with siloxane that, in addition to the excellent fire and heat resistance properties, etc. described above, provide improved impact strength and toughness, improved residual strength after fire exposure, improved flexural modulus, and improved resilience in phenolic foam.

BACKGROUND OF THE INVENTION

Phenolic resins are the oldest of the synthetics, being formed early on by catalyzed reaction between phenol and formaldehyde. Phenolic resins are generally, but not exclusively, thermosetting in nature and are characterized by their excellent heat, flame and chemical resistance, good electrical properties, good resistance to moisture and oxygen, excellent adhesion to a wide variety of substrates, and low cost of production. The properties have led to widespread use of phenolic resins in such applications as wood and fiber bonding, bonded and coated abrasives, friction elements, binders for sand molds and cores in the foundry, structural and contact adhesives, industrial and decorative laminates, composites, and molding compounds and coatings to name a few.

Although cured phenolic resins have excellent physical properties of heat, flame and chemical resistance, phenolic resins are inherently hard and brittle and, therefore, have relatively poor impact resistance and flexibility. Phenolic resins produced by base catalyzed phenol and formaldehyde reaction, i.e., phenolic resoles, display a brittleness that is caused by a high cross-link density that exists throughout the polymeric structure by virtue of large numbers of methylol groups which participate in methylolation reactions.

The brittleness and lack of flexibility of such cured phenolic resins prevents their use in applications where it is desired that the structure formed by such resin, or substrate coated with such resin, be flexible or impact resistant to some degree. Substrates coated with such phenolic resins that are subjected to some degree of flexure or impact lose the heat, flame and chemical resistance afforded by the coating because such flexing or impact causes the brittle coating to break away and leaving the underlying substrate unprotected. Industry has for decades sought improved impact resistance of phenolic compositions.

Techniques are known for forming phenolic resin compositions having improved flexibility when compared to the phenolic resin alone. One such example is by incorporating wood flour, or other reinforcement ingredient, and pigments with other additives to provide a moldable thermosetting phenolic composition having improved flexibility. However, incorporating such reinforcing ingredients and additives to form such phenolic composition have the effect of reducing the heat, flame and chemical resistance provided by the phenolic resin alone. Accordingly, the ability to provide a flexible phenolic composition according to the above technique represented a compromise between reduced heat, flame and chemical resistance and increased flexibility. In applications where both flexibility and a high degree of heat, flame and chemical resistance is required, such technique is not practical.

Another technique for forming a phenolic resin having improved flexibility is by internal plasticizing. In this technique a percentage of the methylol groups are capped, i.e., esterified, by addition of an alcohol such as butanol. The alcohol preferentially reacts with the methylol groups to give butoxy side chains to the resoles. Use of such technique reduces high cross-link density and improves flexibility of the resulting cured phenolic resin by lowering resin functionality. However, the improved flexibility acquired through such technique is at the expense of reduced heat, flame and chemical resistance for the resulting cured phenolic resin. Accordingly, such technique is not useful in providing a phenolic resin that is both flexible and has a high degree of heat, flame and chemical resistance.

Additionally, phenolic resoles that are used to make molding compounds, laminates and composites frequently contain high levels of entrained water. When heat is applied to such resoles during the curing process the water vaporizes, leaving microvoids in the cured article which can lower the tensile strength and flexural modulus of the resulting cured phenolic resole resin, contributing further to the brittleness and nonflexibility of the cured phenolic resole resin. These microvoids can also lead to increased moisture absorption via a porous surface structure, and reduced chemical resistance of the cured phenolic resole resin.

It is, therefore, desirable that a phenolic resin composition be prepared that displays physical properties of good flexibility and impact resistance without reducing the properties of heat, flame and chemical resistance inherent in the phenolic resin. It is also desirable that the phenolic resin composition display decreased water retention during formation and, thereby, display reduced microvoid formation during curing.

BRIEF SUMMARY OF THE INVENTION

There are, therefore, provided in the practice of this invention phenolic compositions prepared by using a sufficient amount of silicone intermediate to form phenolic siloxane compositions having enhanced properties of flexibility and impact resistance in the cured composition when compared to conventional non-siloxane containing phenolic compositions. A first embodiment of the phenolic siloxane composition is prepared by combining a phenol or substituted phenol with an aldehyde and an alkoxy or silanol-functional silicone intermediate. A second embodiment is prepared by combining a major proportion of a phenolic novolac resin with a formaldehyde donor and a minor proportion of an alkoxy or silanol-functional silicone intermediate. A third embodiment is prepared by combining a major proportion of a phenolic resole resin with a minor proportion of an alkoxy or silanol-functional silicone intermediate. The ingredients in each embodiment undergo condensation reactions to form an interpenetrating network of phenolic polymer and siloxane polymer with siloxane or Si—O groups present in the phenolic polymer.

In the first embodiment, a catalyst selected from the group including acids and bases is used to facilitate formation of a desired phenolic novolac or phenolic resole resin from the phenol, or substituted phenol, and aldehyde ingredients.

If desired, a catalyst can be used in the first, second or third embodiments to facilitate condensation of the newly-formed phenolic resin or phenolic resin starting material and can include acids, bases, and formaldehyde donors, depending on whether the phenolic resin formed or used as a starting material is a phenolic resole or a phenolic novolac resin.

If desired, a sufficient amount of catalyst can be used in the first, second or third embodiments to facilitate hydrolysis and/or condensation of the silicone intermediate at low temperatures. The catalyst can include organometallic compounds, amine compounds and mixtures thereof. A preferred catalyst is a mixture of an organometallic compound and an amine compound.

The phenol, aldehyde and silicone intermediate in the first embodiment; the phenolic novolac resin, formaldehyde donor and silicone intermediate in the second embodiment; the phenolic resole resin and silicone intermediate in the third embodiment; and any optionally desired catalysts are mixed together to form a phenolic siloxane composition having improved properties of impact resistance, tensile strength, flexural modulus, and density when compared to conventional non-siloxane containing phenolic resin compositions. Additionally, the phenolic siloxane compositions have equal or better properties of flame, heat and chemical resistance when compared to conventional non-siloxane containing phenolic resin compositions.

BRIEF DESCRIPTION OF THE DRAWINGS

These and other features and advantages will become appreciated as the same becomes better understood with reference to the specification, claims and drawings wherein:

DETAILED DESCRIPTION

Figure 1:
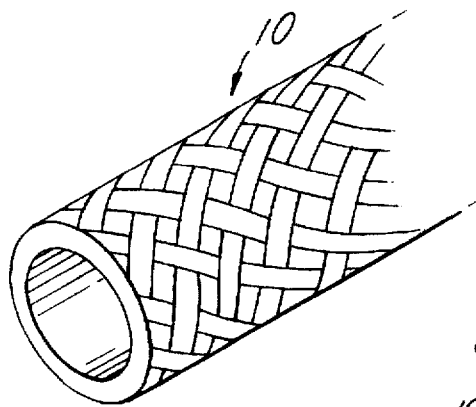
FIG. 1 is an isometric view of a filament wound pipe comprising filament bonded with a phenolic siloxane composition prepared according to principles of this invention.

Phenolic compositions of this invention are prepared by using a sufficient amount of silicone intermediate to form phenolic siloxane compositions. Such phenolic siloxane compositions can be prepared a number of different ways. One way is by combining phenol with an aldehyde and a silicone intermediate. Another way is to combine a phenolic novolac resin, already prepared by reacting phenol and an aldehyde, with a formaldehyde donor and a silicone intermediate. And still another way is to combine a phenolic resole resin, already prepared by reacting phenol and an aldehyde, with a silicone intermediate. Phenolic siloxane compositions of this invention have enhanced properties of flexibility and impact resistance in the cured composition when compared to conventional non-siloxane containing phenolic compositions.

Phenolic siloxane compositions formed according to principles of this invention comprise an interpenetrating polymer network (IPN). IPNs of this invention are composed of chemically dissimilar crosslinking polymer chains; namely, siloxane polymer chains and phenolic polymer chains, which have little or no chemical bonding therebetween. The siloxane and phenolic polymer chains are held together by permanent chain entanglements.

Phenolic siloxane compositions of this invention can optionally be prepared by using: (1) catalysts to reduce the reaction times and lower the reaction temperature associated with forming a phenolic siloxane composition; (2) additives and modifiers to enhance such properties as flow, flexibility and the like; and (3) using pigments and/or fillers to provide a desired color and/or consistency.

By any of these techniques, one prepares a polymeric phenolic resin containing siloxane groups in the polymer. The siloxane groups are in the uncured prepolymer when prepared in the original synthesis of the phenolic siloxane and are in the cross-linked polymer in any case. The siloxane groups are in the backbone of the phenolic polymer and do not just appear as side groups. These groups are believed to contribute to the enhanced flexibility of the phenolic polymer and make the siloxane containing phenolic polymer more impact resistant and flexible than an unmodified phenolic polymer composition, without sacrificing chemical and heat resistance.

In a first embodiment, a phenolic siloxane composition is prepared by combining phenol or substituted phenol, with an aldehyde and a silicone intermediate. Although phenol is a preferred starting material, substituted phenols such as ortho-cresol, meta-cresol, para-cresol, para-tert-butyl phenol, para-octylphenol, para-nonylphenol, paraphenylphenol, bisphenol A, resorcinol, and cashew nut shell liquid can also be used. The choice of using phenol or a substituted phenol as the starting material may depend upon the economics and availability of the raw materials, the manufacturing process, or may depend upon the desired properties for the resulting composition.

With respect to the aldehyde ingredient, formaldehyde is particularly preferred. Suitable aldehydes and aldehyde donors other than formaldehyde that can be combined with phenol, or substituted phenol, to prepare the phenolic siloxane composition include acetaldehyde, paraldehyde, glyoxal, hexamethylene-tetraamine, and furfural. The amount of aldehyde ingredient that is combined with the phenol determines the type of phenolic resin that will be formed by the combination, e.g., whether a phenolic resole siloxane composition or a phenolic novolac siloxane composition will be formed. Whether a phenolic resole or phenolic novolac is desired can depend on the particular properties desired for the phenolic siloxane composition. When the phenol ingredient is combined with a molar excess of aldehyde and a silicone intermediate, the resulting reaction produces a phenolic resole siloxane composition. When the phenol ingredient is combined with a molar deficiency of aldehyde, the resulting reaction produces a phenolic novolac siloxane composition.

With respect to the silicone intermediate, alkoxy-functional and silanol-functional silicone intermediates may be used to form the compositions of this invention. Silicone intermediates as referred to in this invention are chemical polymer structures that have an —Si—O— backbone and that are capable of undergoing further reaction, e.g., hydrolysis and/or condensation to form a cured polymer structure. A preferred class of silicone intermediates have the formula

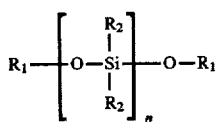

where each $R_2$ is independently selected from the group consisting of the hydroxy group, alkyl, aryl, aryloxy, and alkoxy groups having up to six carbon atoms, where each $R_1$ is independently selected from the group consisting of hydrogen, alkyl, and aratoms, an having up to 12 carbon atoms, and where n is an integer in the range of from 1 to 56, selected so that the average molecular weight of the silicone intermediate is from about 150 to about 10,000. It is believed that the molecular weight of the silicone intermediate selected may have an impact on the degree to which an interpenetrating network (IPN) of phenolic polymer and siloxane polymer is formed, and the proportion of siloxane groups that copolymerize with the phenolic polymer to form a continuous phase.

Another group of silicone intermediate can be represented by an hydroxyl (OH) containing silicone material including those materials wherein the OH group or groups are attached directly to the silicon atom, such as the silanol materials having the general formulas

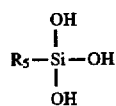

and

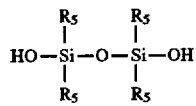

and

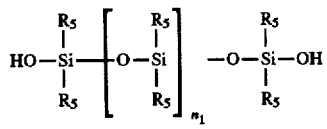

where each $R_5$ group may comprise a hydrocarbon radical selected from the group including alkyl, alkenyl, cycloalkyl, aryl, alkaryl, or aralkyl radicals, and where $n_1$ may be an integer in the range of from about one to thirty.

Still another group of OH containing silicone materials are materials that comprise two or more OH groups attached to a silicon atom that have two or more silicon atoms attached through divalent organic radicals such as those having the general formula

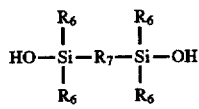

where each $R_6$ group may comprise another OH group or may comprise a hydrocarbon radical selected from the group including alkyl, cycloalkyl, aryl, alkaryl, and alkylaryl radicals, where $R_7$ may comprise a divalent organic radical selected from the group including methylene, polymethylene, aralyene, polyaralyne, cycloalkylene, and polycycloalkylene.

Methoxy functional silicone intermediates useful in this invention include, but are not limited to: DC-3074, DC-3037 from Dow Corning. Corporation of Midland, Mich.; SY-231 (molecular weight approximately 1000) and MSE-100 from Wacker Silicone Corporation; and SR-191 from General Electric. Silanol-functional silicone intermediates generally have in the range of from about 0.5% to 6% by weight Si—OH. Commercially available silanol-functional silicone intermediates useful in this invention include, but are not limited to: Diphenylsilandiol (molecular weight approximately 216), Wacker Silicones SY-409 (molecular weight approximately 10,000) and SY-430; and the following materials from Dow Corning: DC804, DC805, DC806A, DC840, Z-6018, DC-1-2530, DC-6-2230, DC-1-0409, DC-1-0410 and laminating resins 2103, 2104 and 2106.

A preferred first embodiment of a phenolic novolac siloxane composition is prepared by combining phenol, or substituted phenol, an aldehyde such as formaldehyde, and a silicone intermediate. On the basis of a charge weight of one mole of phenol, the weight of formaldehyde will vary between 0.75 and 0.90 moles, and the weight of silicone intermediate will vary between 0.01 and 0.3 moles. The molar ratio of phenol to formaldehyde in a phenolic novolac resin is typically 1:0.75–0.90. Table 1 shows the typical molar ranges of silicone intermediates, having different molecular weights, used to prepare the phenolic novolac siloxane composition.

TABLE 1

| SILICONE INTERMEDIATE | MOLECULAR WEIGHT | 1 MOLE PHENOL AND 0.75 MOLE FORMALDE-HYDE | 1 MOLE PHENOL AND 0.90 MOLE FORMALDE-HYDE |
|---|---|---|---|
| Diphenylsilandiol | 216 | 0.01–0.3 mole silicone intermediate | 0.01–0.3 mole silicone intermediate |
| SY-231 | 1,000 | 0.01–0.2 mole silicone intermediate | 0.01–0.2 mole silicone intermediate |
| SY-409 | 10,000 | 0.01–0.05 mole silicone intermediate | 0.01–0.05 mole silicone intermediate |

A first preferred embodiment of a phenolic resole siloxane composition is prepared by combining phenol, or substituted phenol, an aldehyde such as formaldehyde, and a silicone intermediate. On the basis of a charge weight of one mole of phenol, the weight of formaldehyde will vary between 1.2 and 3 moles, and the weight of silicone intermediate will vary between 0.01 and 0.7 moles. The molar ratio of phenol to formaldehyde in a phenolic resole resin is typically 1:1.2–3. Table 2 shows the typical ranges of silicone intermediates having different molecular weights used to prepare the phenolic resole siloxane composition.

TABLE 2

| SILICONE INTERMEDIATE | MOLECULAR WEIGHT | 1 MOLE PHENOL 1.2 MOLE FORMALDE-HYDE | 1 MOLE PHENOL 3 MOLE FORMALDE-HYDE |
|---|---|---|---|
| Diphenylsilandiol | 216 | 0.01–0.7 mole silicone intermediate | 0.01–0.3 mole silicone intermediate |
| SY-231 | 1,000 | 0.01–0.02 mole silicone intermediate | 0.01–0.02 mole silicone intermediate |
| SY-409 | 10,000 | 0.01–0.05 mole silicone intermediate | 0.01–0.05 mole silicone intermediate |

For each of the above-described first embodiments of the phenolic novolac and phenolic resole siloxane composition, it is desired that in the range of from about 0.5 to 35 percent by weight of the silicone intermediate be used. First embodiments of the phenolic siloxane composition comprising less than about 0.5 percent by weight of the silicone intermediate may form a composition having good properties of heat, flame and chemical resistance, but may have physical properties of reduced flexibility and increased brittleness when compared with a composition comprising in the range of from 0.5 to 35 percent by weight silicone intermediate. First embodiments of the phenolic siloxane composition comprising greater than about 35 percent by weight of the silicone intermediate may form a composition having properties of reduced heat, flame and chemical resistance, but improved flexibility and reduced brittleness when compared with a composition comprising in the range of from 0.5 to 35 percent by weight silicone intermediate.

In preparing first embodiments of the phenolic siloxane composition, catalysts are used to form either a desired phenolic novolac or phenolic resole resin prepolymer. For example, when forming the phenolic novolac siloxane composition, a strong acid such as sulfuric acid, sulfonic acid, oxalic acid, or phosphoric acid is used to facilitate formation of the phenolic novolac resin prepolymer. When forming the phenolic resole siloxane composition, a strong base such as sodium hydroxide, calcium hydroxide or barium hydroxide is used to facilitate formation of the phenolic resole prepolymer. In preferred first embodiments, a phenolic novolac siloxane composition may be prepared by using up to about five percent by weight acid catalyst, and a phenolic resole siloxane composition may be prepared by using up about five percent by weight base catalyst.

Catalysts other than, and in addition to, those described above can optionally be used in preparing first embodiments of the phenolic siloxane composition to facilitate condensation of the phenolic resin and silicone intermediate by reducing the time and/or temperature associated with such reactions. Catalysts useful for facilitating condensation of the phenolic resin and silicone intermediate are the same, and can be used in the same proportion, as those described below that can optionally be used for preparing second and third embodiments of phenolic siloxane composition, i.e., phenolic siloxane compositions formed from starting materials comprising phenolic novolac resins and phenolic resole resins, respectively.

First embodiments of the phenolic novolac resin and phenolic resole siloxane compositions are prepared by first combining the phenol and silicone intermediate ingredients and then adding the aldehyde ingredient to form a mixture of phenolic polymers, siloxane polymers, and phenolic-siloxane polymers. Elevating the temperature of the combined mixture is desirable to reduce reaction times associated with forming the phenolic siloxane composition.

For example, a first embodiment of the phenolic novolac siloxane composition can be prepared by a batch process using a jacketed stainless-steel reaction vessel equipped with a turbine blade or anchor-type agitator, a vapor condenser, and a temperature controller. Typically, molten phenol is charged to the reaction vessel, the agitator is started and silicone intermediate is added. An acid catalyst can be added at this point to facilitate formation of the phenolic novolac polymer. Formalin (37–40 percent aqueous formaldehyde) is then charged to the reaction vessel, either before raising the temperature, or by controlled addition at elevated temperature. A vigorous condensation reaction ensues which is highly exothermic. The condensation step is continued until the desired molecular weight distribution has been achieved, During this time the mixture may become two phases with separation of the resinous component. The actual reaction time will vary depending on the desired molecular weight distribution, the use of one or more catalysts, pH, and aldehyde to phenol to silicone intermediate mole ratios.

The ingredients are mixed together, during which time the phenol, aldehyde and silicone intermediate undergo polycondensation, which polycondensation can optionally be accelerated by action of a catalyst, as described below. During this time, alkoxy-functional silicone intermediates also undergo hydrolysis to form silanol-functional silicone intermediates, which polymerize to form a siloxane polymer and also copolymerize with the newly-formed phenolic novolac resin prepolymer to form a phenolic siloxane composition. Accordingly, the resulting composition comprises an IPN of phenolic novolac polymer and siloxane polymer, and a continuous phase formed from the phenolic polymer having one or more siloxane groups in its backbone. Hydrolysis of the alkoxy-functional silicone intermediates can optionally be accelerated by action of a catalyst, as described below. Alternatively, silanol-functional silicone intermediates can be used in the process which can copolymerize directly with newly-formed phenolic novolac resin prepolymer.

At the end of the condensation period, water, residual moisture, unreacted phenol and low molecular weight species may be removed by atmospheric, vacuum or steam distillation. The point at which distillation is stopped is usually determined by taking a sample of the resin and measuring its melt viscosity. After the resin has cooled, it can be treated in several ways. It can be sold in lump or flake form, compounded to form molding powders, or it can be ground and blended with hexamine and other fillers.

As another example, a first embodiment of the phenolic resole siloxane composition can be prepared by a batch process using the same equipment previously described for preparing a first embodiment of the phenolic novolac siloxane composition. Typically, molten phenol is charged to the reaction vessel, the agitator is started and silicone intermediate is added. Alkaline catalysts may be added at this time to facilitate formation of the phenolic resole polymer. Formalin is added and the batch is heated. The initial reaction is exothermic. Condensation is usually carried out at atmospheric pressure and at temperatures in the range of from 60° to 100° C. or at reflux. Because phenolic resole siloxane compositions are themselves thermosetting, dehydration is carried out quickly and at low temperatures so as to prevent over-reaction or gelation. The end point is found by manual determination of a specific hot-plate gel time, which decreases as resinification advances. Phenolic resole siloxane compositions can be refrigerated to prolong their storage stability.

Second and third embodiments of a phenolic novolac resin and a phenolic resole siloxane composition are prepared by using a phenolic novolac resin and phenolic resole resin, respectively, as starting materials. Any type of phenolic resin can be used to prepare the phenolic siloxane compositions of this invention and is ultimately selected based on the intended end use application. Suitable phenolic resins can include those based on phenol, substituted phenols like para-cresol, xylenol, bisphenol A, paraphenylphenol, para-tert-butyl phenol, para-t-octyl phenol and resorcinol. The phenolic resin can be prepared by combining a suitable phenol with an aldehyde, such as those previously described in the first embodiment. The fundamental synthesis reaction of phenolic resins may proceed in one of two ways, depending upon the ratios of the two primary reactants, i.e., phenol and aldehyde, and depending on the pH or the mixture.

As discussed above, phenolic resins prepared by combining a phenol and aldehyde are generally classified in one of two classes, phenolic novolac resins or phenolic resole resins. Phenolic novolac resins are thermoplastic materials and are made by heating phenol with a deficiency of formaldehyde (usually a formalin) in the presence of an acidic catalyst (frequently oxalic acid or sulfuric acid). It is desired that the formaldehyde/phenol mole ratio (F/P) be less than one, otherwise crosslinking and gelation will occur during manufacture. The reaction is strongly exothermic. The phenolic novolac resin forming reaction can be represented as shown below.

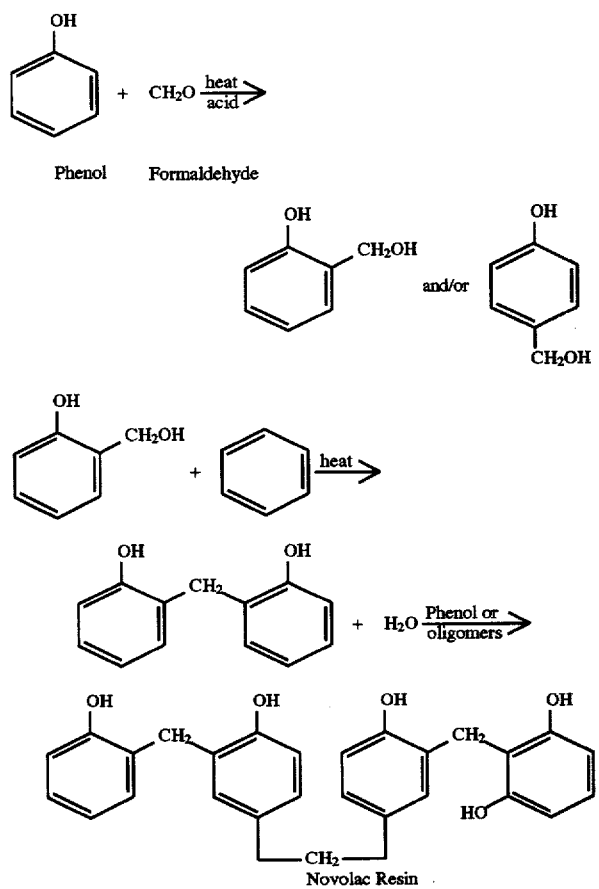

Novolac Resin

The reaction proceeds by first the formation of phenolic alcohols and second the condensation of the phenolic alcohols, which occurs rapidly with excess phenol to form relatively short chain phenolic polymers, e.g., comprising in the range of from two to ten phenolic rings, in which the phenolic rings are linked together by methylene groups. Phenolic novolacs are thermoplastic resins, comprise little methylol functionality, have molecular weights in the range of from about 125 to 5000, and display glass transition temperatures in the range of from 45° C. to 100° C. Phenolic novolacs do not condense further by themselves unless additional formaldehyde or other reactive materials, i.e., formaldehyde donors such as hexamethylenetetraamine, are added. Although most of the cross-linkages in the phenolic novolac are methylene bridges, benzylamine structures have also been identified.

Phenolic resole resins are thermosetting resins, often referred to as one-stage resins. They are prepared by heating phenol with formaldehyde (usually as formalin) using an alkaline catalyst (usually caustic soda for water-soluble resins and ammonia or an amine for electrical grade laminating resins). The formaldehyde to phenol mole ratio (F/P) is greater that one. The phenolic resole forming reaction is represented as shown below.

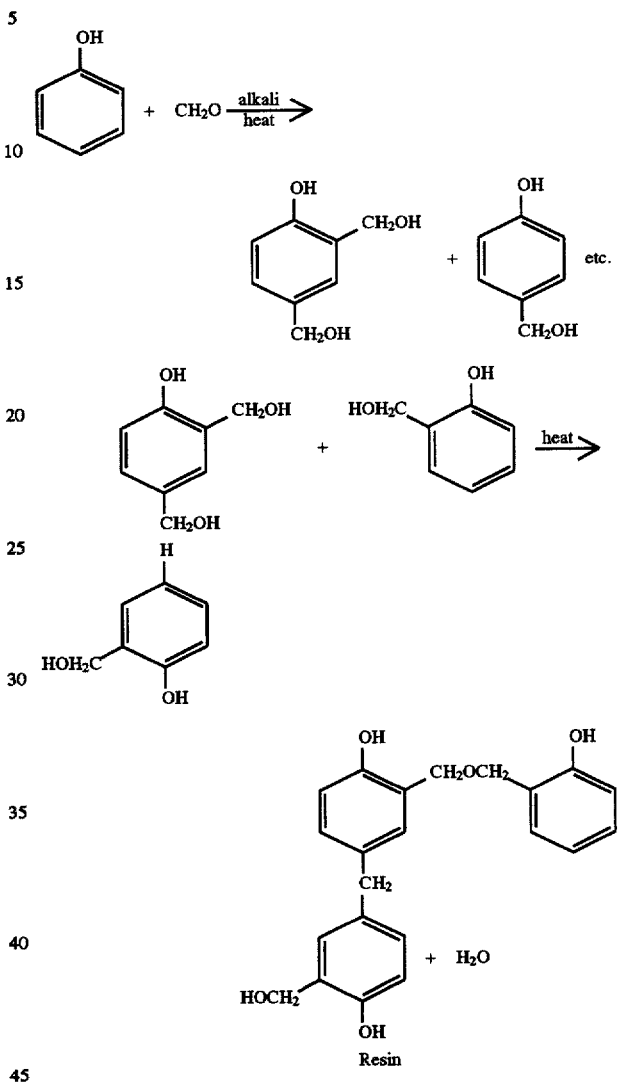

Resin

During reaction, methylolation of the phenol occurs with little condensation. The resulting phenol alcohols may condense together under these conditions to give polymers with ether as well as with methylene bridges between the phenolic rings. More importantly, the reaction produces phenolic polymers that also bear many pendant methylol groups. Depending upon the type of phenolic raw material, and the extent to which the reactions are allowed to proceed, the resoles can cover a wide spectrum of possible structures and may be liquid or solid, water soluble or insoluble, alkaline or neutral, slow curing or highly reactive. Typical phenolic resoles have molecular weights in the range of from 150 to 2000.

Phenolic resoles will self condense with heat to form a cross-linked phenolic polymer without the addition of any other curing agent. If desired, however, an acid catalyst may be used to reduce the curing time. Suitable optional catalysts include inorganic acids such asphosphoric, sulfuric and hydrochloric acids, and organic acids such as paratoluene sulfonic and phenyl sulfonic acids. Proprietary inorganic and organic acids which liberate the active acid functionality on heating can also be used. If desired, phenolic resoles can also be cured using an optional base catalyst, such as proprietary magnesium oxides and the like.

Any phenolic resin, e.g., phenolic novolac or resole, can be used to prepare second and third embodiments, respectively, of the phenolic siloxane compositions according to principles of this invention. The particular phenolic novolac or resole that is selected is based largely on the end use application, the desired physical and chemical properties of the final product, and the methods of application or processing techniques that will be used.

For example, in preparing a composite such as a glass-reinforced structure using a filament winding process, a low viscosity phenolic resole prepared from phenol and formaldehyde could be used for optimum wetting of the glass and high final glass content. Medium viscosity resoles could be used for fabricating compositions by a molding process. Fabrication of a glass reinforced composite by pultrusion requires the use of a phenolic resole with a high level of a sulfonic acid catalyst for very fast cure rates.

For example, in designing a heat cured coating used for lining the interior of a chemical storage tank, or for lining an interior of cans and drums, one could use a phenolic or substituted phenolic heat reactive resole. Such resole can be used, often in combination with an epoxy resin, for optimum resistance to chemicals and corrosion. For example, ambient temperature curing metal primers can be prepared from a phenolic resole and an inorganic (e.g., phosphoric, sulfuric or hydrochloric) acid or organic (paratoluene sulfonic or phenyl sulfonic) acid combined immediately prior to application.

For example, phenolic resins that are used to make molding compounds are primarily novolacs which are combined with 5 to 15% hexamethylenetetraamine as a curative agent. These materials are compounded with glass fibers, mineral extenders, rubber modifiers, etc. in a pulverized or pelletized form which is used to fabricate various articles by compression, transfer, centrifugal and injection molding processes.

The solid phenolic novolacs found most useful in this invention are prepared from any of the phenols and aldehydes previously described and have molecular weights in the range of from about 400 to 5000 with glass transition temperatures in the range of from about 40° C. to 90° C. Phenolic resoles found most useful in this invention have molecular weights in the range of from about 300 to 3000, solids contents from 50 to 90% by weight, and may contain from 2 to 20% by weight free phenol or substituted phenol and from 1 to 10% by weight water.

Manufacturers of suitable phenolic resins include: B. P. Chemical Division of British Petroleum of Barry U.K.; the Packaging and Industrial Products Division of Borden, Inc., of Columbus, Ohio; the Durez Division of Occidental Petroleum of Dallas, Tex.; Georgia-Pacific Corporation of Atlanta, Ga.; Neste Resins Corporation of Eugene, Oreg., as well as a number of other small producers. Some preferred phenolic resins include B. P. Chemical's Cellobond J2018L and J2027L, Borden's SL-898 phenolic resole, and Georgia-Pacific's GP5018 phenolic resole.

A second embodiment of the phenolic novolac siloxane composition, prepared according to principles of this invention, may comprise in the range of from 50 to 95 percent by weight of the phenolic novolac resin. A third embodiment of the phenolic siloxane composition may comprise in the range of from 65 to 99.5 percent by weight of the phenolic resole resin. A phenolic siloxane composition comprising less than about 50 percent by weight of the phenolic resin may form a composition having reduced properties of heat, flame and chemical resistance when compared with a composition comprising the preferred percent range of the phenol or phenolic resin. A composition comprising greater than about 99.5 percent by weight of the phenolic resin will form a composition having good heat, flame and chemical resistance, but having reduced flexibility, and increased brittleness when compared with a phenolic siloxane composition comprising the preferred percent range of the phenolic resin.

With respect to the silicone intermediate, those silicone intermediates previously described for preparing the first embodiments of the phenolic siloxane composition are also used to prepare the second and third embodiments of the phenolic siloxane compositions. Second and third embodiments of a phenolic siloxane composition may each comprise in the range of from 0.5 to 35 percent by weight of the alkoxy-functional or silanol-functional silicone intermediate.

In the second embodiment, a phenolic novolac siloxane composition is prepared by combining a phenolic novolac resin with a formaldehyde donor and a silicone intermediate. Suitable formaldehyde donors include aqueous formaldehyde solutions, paraform, trioxane, hexamethylenetetraamine and the like, a preferred material being hexamethylenetetraamine. A second embodiment of the phenolic novolac siloxane composition may comprise in the range of from about 3 to 15 percent by weight of the formaldehyde donor.

A phenolic novolac siloxane composition comprising less than about 3 percent by weight of the formaldehyde donor may form a composition having a low degree of cross linking and having a slow curing time when compared with a composition comprising in the range of from 3 to 15 percent by weight of the formaldehyde donor and, therefore, may display physical properties of reduced heat, flame and chemical resistance. A phenolic novolac siloxane composition comprising greater than about 15 percent by weight of the formaldehyde donor may form a composition having a high degree of cross linking and having a faster curing time when compared with a composition comprising in the range of from 3 to 15 percent by weight of the formaldehyde donor, thus, making working with and application of the composition to form structures and/or coatings difficult.

In the third embodiment, a phenolic resole siloxane composition is prepared by combining a phenolic resole resin with a silicone intermediate. If desired, either an acid or base catalyst can optionally be used to reduce reaction time associated with finally curing the resin. Suitable inorganic acid catalysts that can optionally be used in the third embodiment include phosphoric, hydrochloric, and sulfuric acids. Suitable organic acids that can optionally be used in the third embodiment include paratoluene sulfonic and phenyl sulfonic acids. Suitable base catalysts for curing phenolic resoles include various forms of barium and magnesium oxide, and the like. Commercially available proprietary acid type catalysts also useful in this invention are available from British Petroleum Chemicals under the trade name Phencat 381 and Phencat 382. Other proprietary catalysts include Borden RC-901, a diphenyl phosphoric acid ester supplied from Dover Corp., having the product name Doverphos 231L, and Georgia-Pacific's GP3839 and GP308D50.

A third embodiment of the phenolic resole siloxane composition may comprise up to about 15 percent by weight of the optional acid or base catalyst or curing agent. A phenolic resole siloxane composition comprising greater than about 15 percent by weight of the acid or base catalyst may form a composition having a high degree of cross linking and rapid curing time when compared with a composition prepared without the catalyst or using less than 15 percent by weight acid or base catalyst, thus, making working with and application of the composition to form structures and/or coatings difficult. If desired, the second embodiment may optionally comprise up to about 15 percent of the optional acid or base catalyst to further reduce the curing time.

If desired, the first, second and third embodiments of the phenolic siloxane compositions may each optionally comprise a sufficient amount of catalyst to reduce the reaction time and reduce the reaction temperatures associated with condensing the silicone intermediate and copolymerizing it with the phenolic polymer during formation of the phenolic siloxane composition. It is to be understood that the use of such catalyst is optional and is not required to prepare the first, second, and third embodiments of the phenolic siloxane compositions according to principles of this invention, as a reduction in reaction time can alternatively be achieved without such catalyst by using elevated reaction temperatures.

Suitable catalysts are selected from the group consisting of organometallic compounds, amine compounds, and mixtures thereof. Combinations of an organometallic compound with an amine compound are preferred, when desired, for catalyzing hydrolysis and/or condensation of the silicone intermediate. Useful organometallic compounds include metal driers well known in the paint industry such as zinc, manganese, cobalt, iron, lead and tin octoate, neodecanates and naphthenates, and the like. Organotitanates such as butyl titanate and the like are also useful in the current invention.

A preferred class of organometallic compounds useful as a catalyst is organotin compounds which have the general formula

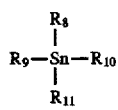

where $R_8$, $R_9$, $R_{10}$ and $R_{11}$ are selected from the group consisting of alkyl, aryl, aryloxy, and alkoxy groups having up to 11 carbon atoms, and where any two of $R_8$, $R_9$, $R_{10}$ and $R_{11}$ are additionally selected from a group consisting of inorganic atoms consisting of halogen, sulfur and oxygen.

Organotin compounds useful as catalysts include tetramethyltin, tetrabutyltin, tetraoctyltin, tributyltin chloride, tributyltin methacrylate, dibutyltin dichloride, dibutyltin oxide, dibutyltin sulfide, dibutyltin acetate, dibutyltin dilaurate, dibutyltin maleate polymer, dibutyltin dilaurylmercaptide, tin octoate, dibutyltin bis (isooctylthioglycolate), butyltin trichloride, butylstannoic acid, dioctyltin dichloride, dioctyltin oxide, dioctyltin dilaurate, dioctyltin oxide, dioctyltin dilaurate, dioctyltin maleate polymer, dioctyltin bis (isooctylthioglycolate), dioctyltin sulfide, and dibutyltin 3-mercapto propionate.

The first, second and third embodiments of the phenolic siloxane composition may comprise up to about five percent by weight of the organometallic catalyst. A phenolic siloxane composition comprising greater than about five percent by weight of the organometallic compound may form a composition having a high degree of flexibility when compared with a composition formed without the catalyst or comprising less than about five percent by weight organometallic compound, because of increased hydrolysis and/or condensation reactions by the silicone intermediate. Additionally, a phenolic siloxane composition prepared without the organometallic catalyst may require longer time and/or higher temperature to achieve a desired condensation reaction than for a phenolic siloxane composition with the organometallic compound.

With respect to the amine compound, preferred amine compounds for optionally catalyzing the hydrolysis and/or condensation reactions of the silicone intermediate have the general formula

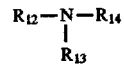

where $R_{12}$ and $R_{13}$ are each selected from the group consisting of hydrogen, aryl, and alkyl groups having up to 12 carbon atoms, and where $R_{14}$ is selected from the group consisting of alkyl, aryl, and hydroxyalkyl groups having up to 12 carbon atoms.

Suitable amine compounds useful as catalysts include dimethyl methanolamine, ethylamino ethanol, dimethyl ethanolamine, dimethyl propanolamine, dimethyl butanolamine, dimethyl pentanolamine, dimethyl hexanolamine, methylethyl methanolamine, methylpropyl methanolamine, methylethyl ethanolamine, methylethyl propanolamine, monoisopropanolamine, methyldiethanolamine, triethanolamine, diethanolamine, and ethanolamine. Preferred amine compounds include dimethyl ethanolamine and ethyl aminoethanol.

If desired, the organometallic compound and amine compound can each be used independently to form a phenolic siloxane composition. However, it has been discovered that when combined, the organometallic compound and amine compound act synergistically to catalyze the curing process, thereby reducing the curing time further and/or reaction temperatures greater than that observed by using either the organometallic or amine catalyst alone. Accordingly, if desired under the circumstances, it is preferred that an organometallic compound be used in combination with an amine compound to catalyze both the formation of hydroxide by hydrolysis of the silicone intermediate, in the event that an alkoxy-functional silicone intermediate is used, and polymerization by condensation of both the alkoxy and silanol-functional silicone intermediate. An exemplary organometallic and amine compound combination is dibutyltin diacetate and ethyl aminoethanol. Dibutyltin diacetate, when combined with the amine, reacts synergistically to catalyze the curing process. Although it is believed that the synergistic effect of the organotin compound and the amine compound is mechanistic in character, the exact mechanism is not known.

An unexpected effect of combining an organometallic compound and amine compound to prepare phenolic siloxane compositions of this invention is an improvement in processability. Phenolic resole siloxane/latent-acid catalyst-type compositions prepared by using an organometallic and amine catalyst display increased pot-lives and comparable or decreased cure times when compared to non-organometallic/ amine catalyzed compositions. Increasing the latent acid catalyst level during the preparation of such compositions has, in fact, resulted in phenolic resin compositions with cure times comparable to straight phenolic resole/latent acid catalyst systems, but with significantly longer pot-life. The exact mechanism for the unexpected improvement in the processability of the resulting composition is not known but is believed to be related to neutralization of the latent acid catalyst by the amine compound.

The first, second and third embodiments of the phenolic siloxane composition may comprise up to about five percent by weight of the amine catalyst. A phenolic siloxane composition comprising greater than about five percent by weight of the amine compound may form a composition having a greater degree of flexibility when compared with a composition prepared without using an amine compound or using less than five percent by weight amine compound because of increased hydrolysis and/or condensation of the silicone intermediate. Additionally, a phenolic siloxane composition prepared without the amine catalyst may require longer time and/or higher temperature to achieve a desired condensation reaction than for a phenolic siloxane composition with the amine catalyst.

A preferred ratio of organometallic compound to amine compound, when used together as the catalyst, is approximately one to one. Therefore, the first, second and third phenolic siloxane compositions may comprise up to about 10 percent by weight combined organometallic and amine catalyst. Accordingly, a phenolic siloxane composition prepared by combining an organometallic and amine catalyst, and an optional acid or base catalyst may comprise up to about 25 percent by weight catalyst. Preferred first, second and third phenolic siloxane compositions may comprise catalyst in the range of from 5 to 25 percent by weight of the total composition.

Water may be present in the form of an aqueous phenolic resole or in the form of an aqueous formaldehyde. For example, the phenolic resole may comprise in the range of from 3 to 12 percent by weight water, and the formaldehyde may comprise formalin, which is approximately 37–40 percent aqueous formaldehyde. When an alkoxy-functional silicone intermediate is used to prepare the compositions, water is desired to promote the hydrolysis of the alkoxy groups. This water can be present in the phenolic composition or absorbed from the air during processing. However, it is to be understood that phenolic siloxane compositions prepared according to principles of this invention can be prepared without added water, or in the absence of any type of solvent. A nonaqueous phenolic resole or phenolic novolac, i.e., a phenolic resole that does not comprise added water, can be used in the event that a silanol-functional silicone intermediate, rather than an alkoxy-functional silicone intermediate, is used to prepare the composition, as hydrolysis of the silicone intermediate is not required.

The first, second and third embodiments of the phenolic siloxane composition can result in the formation of phenolic resins having very low or zero water content, which provides improved fire stability and processing characteristics. The silicone intermediate functions as a reactive diluent to give a stable product with generally low viscosity.

Second and third embodiments of the phenolic siloxane compositions are prepared by combining in the abovementioned proportions a phenolic novolac or resole resin with a methoxy or silanol-functional silicone intermediate. A formaldehyde donor is added in the second embodiment. If desired, the catalyst for the phenolic resin, and the catalyst for the silicone intermediate, i.e., the organometallic compound and/or the amine compound, can optionally be added to reduce reaction and cure time and reduce reaction temperature.

The ingredients are mixed together until uniform, during which time the phenolic resin undergoes polycondensation to form a phenolic polymer, which polycondensation is aided by the formaldehyde donor in the second embodiment, and which polycondensation can optionally be accelerated by action of the catalyst, i.e., an acid or base, in the third embodiment. During this time, the alkoxy-functional silicone intermediates also undergo hydrolysis to form silanol-functional silicone intermediates. The silanol-functional silicone intermediates both polymerize to form a siloxane polymer and copolymerize with the phenolic polymer to form a phenolic siloxane composition. Hydrolysis of the alkoxy-functional silicone intermediates can optionally be accelerated by catalytic action of the organometallic compound and the amine compound. Accordingly, the resulting composition comprises a IPN of phenolic polymer and siloxane polymer, wherein the phenolic polymer has siloxane groups in the backbone of the polymer. A phenolic siloxane composition prepared in this manner may have a pot life in the range of from 1 to 3 hours, depending on the particular ingredients selected and their proportions.

Alternatively, a phenolic siloxane composition according to principles of this invention may be prepared as a three component system (absent added water) by combining, in the proper proportions, the silicone intermediate and any optional organometallic compound and amine compound in a first container, which can be stored until just before use. The phenolic resin is stored in a second container, and the formaldehyde donor in the second embodiment and any optional catalyst for the phenolic resin can each be stored in separate third containers that are combined with the silicone intermediate mixture in the first container just before use to form the composition. For example, in the construction of a glass filament phenolic pipe the components of each container can be combined using a meter-mixing dispensing machine, which pours or pumps the mixed material into a holding tank through which the glass filament is passed.

While not wishing to be bound by any particular theory or mechanism, it is believed that the phenolic siloxane compositions of this invention are produced in the following manner. In preparing a first embodiment of a phenolic siloxane composition by using a phenol, aldehyde and a silicone intermediate as the starting ingredients, it is theorized that either a phenolic resole or phenolic novolac may be formed according to well established principles disclosed by P. W. Kopp, *Phenolic Resins, Encyclopedia of Polymer Science and Engineering*, Vol. 11, 2d ed., pgs. 45–95 (1988), which is hereby incorporated by reference.

It is theorized that during formation of the phenolic resin, and subsequent polymerization of the resulting phenolic resin, silanol groups of the silicone intermediate both react with silanol groups of other silicone intermediates, forming a siloxane polymer, and react with phenolic hydroxyls and methylol hydroxyls of the phenolic resin, forming a phenolic polymer having siloxane groups in the polymer. The mechanism by which such reactions are believed to occur are similar to those mechanisms discussed below and illustrated in Reactions 1–6. However, it is to be understood that reaction mechanisms other than those specifically described and illustrated may be responsible for introducing siloxane into the phenolic polymer of the first embodiment. Additionally, it is theorized that such other reaction mechanisms may produce phenolic siloxane structures different than those specifically described and illustrated.

In forming a third embodiment of a phenolic resole siloxane composition, using an optional acid or base catalyst to cure the phenolic resole, the phenolic resoles undergo polymerization with other phenolic resoles to form a cured phenolic resole as illustrated below in Reaction No. 1.

REACTION #1

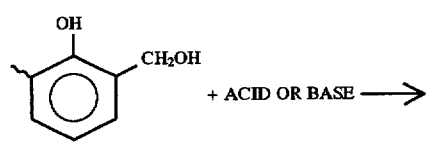

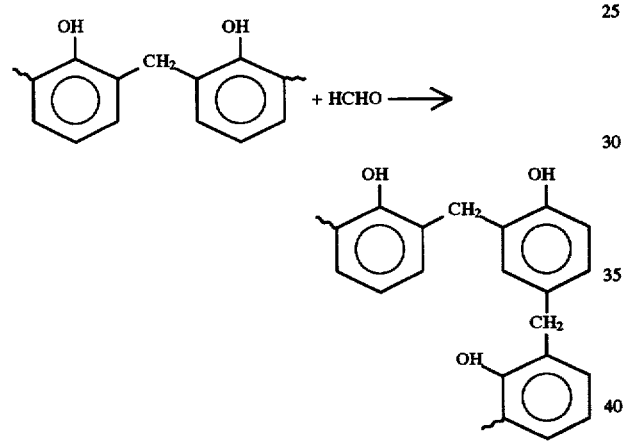

In forming a second embodiment of a phenolic novolac siloxane composition, the phenolic novolacs undergo polymerization with other phenolic novolacs and formaldehyde, or a formaldehyde donor, to form a cured phenolic novolac as illustrated below in Reaction No. 2. It is believed that most of the bridges between the phenol groups are methylene, but benzylamine structures have also been identified.

REACTION #2

The exact mechanism of formaldehyde addition to the phenol group of the phenolic novolac and subsequent polymerization, however, is still not clearly understood.

If an alkoxy-functional silicone intermediate is used in combination with a phenolic novolac or resole and an optional organometallic/amine catalyst to prepare the second and third embodiments of the composition, respectively, hydrolysis of the silicone intermediate to form a silanol-functional silicone intermediate and an alcohol is believed to occur first as illustrated in Reaction No. 3 below.

REACTION #3

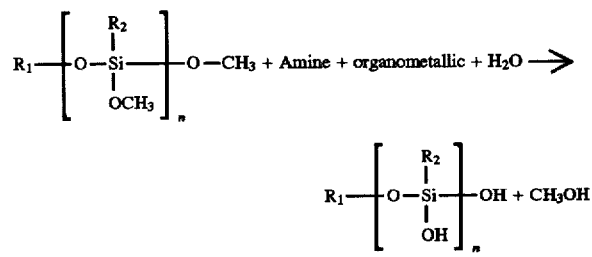

The silanol groups of either the hydrolyzed alkoxy-functional silicone intermediate or the silanol-functional silicone intermediate can react with the phenolic prepolymer according to many different mechanisms. In one mechanism, the silanol groups undergo condensation reactions with the phenolic hydroxyls of the cured phenolic resin to form the phenolic siloxane composition having siloxane groups in the phenolic polymer, as illustrated in Reaction No. 4 below.

REACTION #4

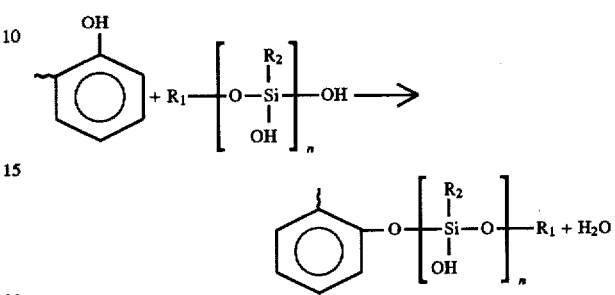

The silanol group of the silanol-functional silicone intermediate may also react with phenolic methylol groups of the phenolic resin to form the phenolic siloxane composition having siloxane groups in the phenolic polymer, as illustrated in Reaction No. 5 below.

REACTION #5

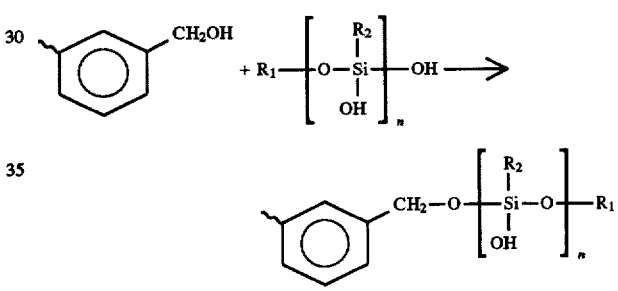

The condensation reactions of the silicone intermediate with the phenolic resin prepolymer illustrated in Reaction Nos. 4 and 5 are believed to be responsible for the improved properties of impact resistance, tensile strength, and flexural modulus displaced by the phenolic siloxane composition.

The silanol groups of the silicone intermediate also undergo condensation with silanol groups of other silicone intermediates to form a siloxane prepolymer. The siloxane prepolymer may undergo condensation reactions with the phenolic prepolymer, as discussed above, or may undergo polycondensation reactions with siloxane prepolymers to form a cross-linked polysiloxane network, as illustrated in Reaction No. 6 below.

REACTION #6

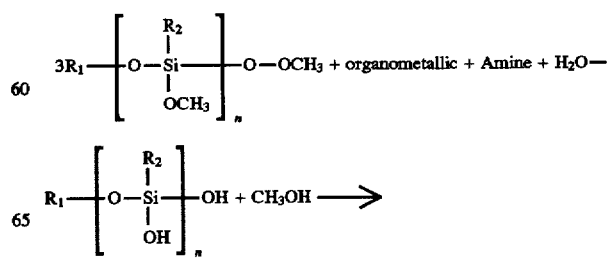

-continued
REACTION #6

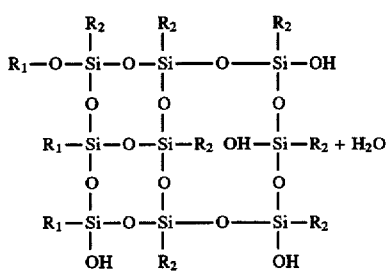

Accordingly, phenolic siloxane compositions of this invention comprise an IPN of phenolic polymer and siloxane polymer having Si—O groups in the phenolic polymer. The siloxane polymers of the composition may be cross linked with other siloxane polymer. Additionally, crosslinking may also take place to some extent between phenolic polymers and/or between phenolic and siloxane polymers. It is believed that the improved properties of impact strength and flexibility of the phenolic siloxane compositions are due to: (1) the presence of siloxane as a linear polymer, forming an IPN of siloxane and phenolic polymers; the presence of siloxane as a copolymer in the phenolic polymer; and (3) the presence of siloxane polymer in a cross-linked form.

Features and advantages of phenolic siloxane compositions prepared according to principles of this invention are better understood with reference to the following examples.

Table 3 lists the ingredients that were used to form two inch (50 mm.) inside diameter glass reinforced pipes that were prepared, using a conventional filament winding process, from both an unmodified phenolic resole resin (Example 1), and from a third embodiment of the phenolic resole siloxane composition (Examples 2 and 3). Table 4 summarizes tested properties for each of the pipes identified as Example 1, 2 and 3 in Table 3.

TABLE 3

| INGREDIENTS | EXAMPLE 1 PBW | 1% | EXAMPLE 2 PBW | 1% | EXAMPLE 3 PBW | 1% |
|---|---|---|---|---|---|---|
| Cellobond J2027L (phenolic resole resin) | 100 | 91 | 85 | 70 | 85 | 70 |
| Phencat 381 (phenolic resin catalyst) | 10 | 9 | 14 | 11 | 14 | 11 |
| DC-3074 (silicone intermediate) | — | — | 15 | 12 | — | — |
| Hydrolyzed DC-3074 (silicone intermediate) | — | — | — | — | 15 | 12 |
| Dibutyltin diacetate (catalyst) | — | — | 4 | 3 | 4 | 3 |
| Ethylamino ethanol (catalyst) | — | — | 4 | 3 | 4 | 3 |
| Pot life (hours) | 1.5 | | 2.5 | | 2.5 | |

TABLE 4

| PROPERTIES OF CURED PIPE | EXAMPLE 1 | EXAMPLE 2 | EXAMPLE 3 |
|---|---|---|---|
| Specific gravity | 1.85 | 1.95 | 1.96 |
| Glass content (wt. %) | 73.1 | 74.0 | 72.2 |
| Outside diameter (in.) | 2.709 | 2.418 | 2.408 |
| Thickness (in.) | 0.159 | 0.164 | 0.159 |
| Short-term burst pressure (psi) | 3,500 | 4,100 | 4,200 |
| Hoop stress (psi) | 25,000 | 28,180 | 29,700 |
| Impact strength (2 lb. steel ball) | 24" | 48" | 60" |
| Flame test | pass | pass | pass |

[1]Glass roving was Owens Corning Fiberglass Type 30-158B-450 yield.

EXAMPLE 1

An unmodified phenolic pipe was prepared by combining BP Cellobond J2027L (phenolic resole) with Phencat 381 (latent acid catalyst).

EXAMPLE 2

A phenolic pipe was formed from a phenolic resole siloxane composition according to a third embodiment this inventions prepared, using the same phenolic resole and latent acid catalyst as used in Example 1, with the addition of 15 percent by weight DC-3074 (a methoxy functional silicone intermediate from Dow Corning with an average molecular weight of 1400 and a methoxy content of 15–25 percent), four percent by weight dibutyltin diacetate (organometallic silicone intermediate catalyst), and four percent by weight ethylamino ethanol (amine silicone intermediate catalyst). The ingredients were combined and blended together by conventional means to form a homogeneous mixture.

EXAMPLE 3

A phenolic pipe was prepared in the same manner as Example 2 with the exception that prehydrolyzed DC-3074 was used in place of non-prehydrolyzed DC-3074. Prehydrolyzed DC-3074 was prepared by charging 3640 grams of the DC-3074, 153.4 grams deionized water, 153.4 grams methanol, 220 grams xylene and 16.25 grams glacial acetic acid to a 5000 milliliter round bottomed flask equipped with heating mantel, stirrer and condenser. The mixture was heated to reflux and held for approximately two hours. The flask was then fitted with a distillation head and receiver, and distillate was collected until the pot temperature reached 300° F. (150° C.). The resulting product, prehydrolyzed DC-3074, was a viscous, slightly turbid liquid.

About 4000 grams of each phenolic siloxane composition was prepared and mixed in a one gallon can and then transferred to a holding tank. Glass roving was passed through the phenolic siloxane composition and wound around a hollow steel mandrel on a reciprocating process pipe machine to the desired thickness. Each pipe was then cured for about 30 minutes at 140°–190° F. (60°–88° C.) by passing a steam/water mixture through the hollow mandrel. The pipe was then stripped from the mandrel and post cured about two hours at 250° F. (120° C.).

The compositions of Examples 2 and 3, i.e., the phenolic resole siloxane compositions formed according to the third embodiments of this invention, each had a pot life of about 2½ hours, compared to a pot life of about 1½ hours for the unmodified phenolic resin composition of Example 1. Glass reinforced pipes made from the phenolic siloxane compositions of Examples 2 and 3 also demonstrated significantly higher short term burst pressure, hoop stress and impact strength than that of glass reinforced pipes formed from the unmodified phenolic resin of Example 1.

Specifically, the pipes made according to Examples 2 and 3 illustrate the dramatic increase in impact strength that can be achieved when using the phenolic siloxane compositions of this invention to make pipe, when compared to the conventional phenolic pipe of Example 1. In comparing these Examples, one sees that the impact strength for the pipes of Examples 2 and 3 was more than twice that of the pipe of Example 1, demonstrating the benefits that result from using a sufficient amount of silicone intermediate to form a phenolic composition according to principles of this invention.

Additionally, the phenolic siloxane compositions of Examples 2 and 3 displayed higher specific gravities than the composition of Example 1, indicating the formation of a composition having reduced foaming and reduced microporosity. The exact mechanism for this effect is not understood. However, it is believed that the silicone intermediate reacts with some of the water in the phenolic resole before it is volatilized during the cure process to reduce the level of entrained water, thereby reducing microvoid formation. A Reduced microvoid formation results in the cured phenolic resole having an increased tensile strength and flexural modulus, thereby contributing to an increased impact resistance.

Reduced microvoid formation also results in the production of a cured product having a reduced water absorption. It is believed that the presence of siloxane in the phenolic siloxane composition, in addition to providing enhanced impacts strength and flexibility, may make the cured composition hydrophobic. A phenolic composition having reduced microvoid, and an associated reduction in water absorption, may be desirable for making products useful in electrical insulation applications where exposure to water may occur. An example of such an application is for electric train third rail cover composites constructed according to Mil Spec M14G.

No deleterious effect on the fire resistance of phenolic siloxane pipe was observed. All three systems passed a five-minute, 1000° C. jet flame test without burning. Accordingly, phenolic siloxane compositions of this invention provide the above-identified advantages and improvements without detracting from the flame, heat and chemical resistance inherent in the phenolic resin. These examples clearly indicate the advantages and improvements imparted by the phenolic siloxane compositions of the present invention.

Table 5 summarizes the results of chemical resistance testing on castings that were formed from an unmodified phenolic resole and from third embodiments of phenolic resole siloxane compositions prepared according to principles of this invention.

TABLE 5

| WEIGHT IN GRAMS | EXAMPLE 4 | EXAMPLE 5 | EXAMPLE 6 |
|---|---|---|---|
| Cellobond J027L (phenolic resole) | 150 | 150 | 150 |
| DC-3074 (silicone intermediate) | 0 | 15 | 30 |
| Phencat 381 (phenolic catalyst) | 12 | 21 | 21 |
| Dibutyltin diacetate (catalyst) | 0 | 1.4 | 1.4 |
| Ethylamino ethanol (catalyst) | 0 | 1.2 | 1.8 |
| 37% HCl (180° F.) | 6.6521 g | 5.6433 g | 5.5134 g |

TABLE 5-continued

| WEIGHT IN GRAMS | EXAMPLE 4 | EXAMPLE 5 | EXAMPLE 6 |
|---|---|---|---|
| Dried weight | 6.3483 g | 5.5378 g | 5.5728 g |
| wt. gain/loss | −4.567% | −1.869% | +1.077 |
| 50% NaOH (180° F.) | 5.5000 g | 6.2269 g | 6.5439 g |
| Dried weight | 5.2278 g | 6.3208 g | 7.0039 g |
| wt. gain/loss | −4.949% | +1.508% | +7.029% |
| 30% HNO$_3$ (80° F.) | 5.7074 g | 6.676 g | 6.0638 g |
| Dried Weight | 1.286 g | Dissolved | Dissolved |
| wt. gain/loss | −0.77467849 | | |
| 50% H$_2$SO$_4$ (180° F.) | 6.292 g | 5.9112 g | 5.6498 g |
| Dried weight | 6.0008 g | 5.6563 g | 5.5082 g |
| wt. gain/loss | −4.628% | −4.312% | −2.506% |
| Ethanol (140° F.) | 5.6487 g | 6.475 g | 5.3084 g |
| Dried weight | 6.4175 g | 5.4117 g | 5.5435 g |
| wt. gain/loss | +13.610% | −16.422% | +4.429% |
| 50% Acetic acid (180° F.) | 5.5196 g | 5.8308 g | 4.8967 g |
| Dried weight | 5.2912 g | 5.8939 g | 4.9778 g |
| wt. gain/loss | +2.55% | +1.68% | +1.66% |
| Distilled H$_2$O (180° F.) | 5.3084 | 6.0035 | 5.5134 |
| Dried weight | 5.2869 | 6.0021 | 5.4446 |
| wt. gain/loss | −0.41 | −0.02 | −1.25% |

EXAMPLES 4–6

In Example 4, a casting has been formed from a composition comprising a conventional unmodified phenolic resole. Examples 5 and 6 are castings formed from a phenolic siloxane composition according to a third embodiment of this invention, using the same chemical ingredients as that previously described for Examples 2 and 3. Each formulation was mixed in a plastic beaker at ambient temperature and then poured into 12"×1" (30×2.5 cm.) steel molds to a height of about 5/16 inch (8 mm.). The castings were cured one hour at 150° F. (65° C.), followed by five hours at 250° F. (120° C.). Each casting was then cut into two-inch (5 cm.) lengths and allowed to cure for one month at 70° F. (21° C.) and at 50 percent relative humidity. Each two-inch length of casting was weighed on an analytical balance and immersed into the test chemical. After two weeks immersion at the indicated temperature, the samples were removed, rinsed and dried for one hour at 250° F. (120° C.) before reweighing.

Surprisingly, the test results of Examples 4, 5 and 6 show that castings formed from the third embodiment of the phenolic resole siloxane composition exhibit improved chemical resistance to organic and inorganic acids, alkali and alcohol, over that of the unmodified casting formed from the phenolic resole alone.

Phenolic siloxane compositions prepared according to principles of this invention display improved physical, properties of flexibility, impact resistance, and flexural modulus without affecting the physical properties of heat, flame and chemical resistance inherent in the phenolic resin. Additionally, phenolic siloxane compositions prepared according to principles of this invention have reduced microvoid formation and, therefore, densities closer to theoretical density when compared to conventional non-siloxane containing phenolic resin compositions, probably due to reaction by the silicone intermediate with water in the phenolic resole to reduce the amount of entrained water.

Phenolic siloxane compositions prepared according to principles of this invention also display improved coatability onto substrates, or as an underlying substrate, when compared to non-siloxane containing phenolic resin compositions. The improved coatability is believed to be due to the presence of silanol groups in the composition, which provide an enhanced bonding source for the composition when it is used either as a coating applied to a substrate, or as a substrate to support a coating. Phenolic siloxane compositions of this invention can be used in the same manner as conventional phenolic resins to form structures, e.g., castings, coatings, e.g., coatings on glass reinforced pipe, and the like.

Phenolic siloxane compositions prepared according to principles of this invention can be used in the same manner as conventional phenolic resins to provide, in addition to the inherent fire resistance, heat resistance, chemical resistance, abrasion and wear resistance, improved properties of impact strength, toughness, flexural modulus, resiliency.

For example, phenolic siloxane compositions of this invention can be used in the construction of composites. Composites, are understood to refer to a multi-phase system or structure comprising a binder material and a reinforcing material, that combine to produce some structural or functional properties not present in any individual component. The phenolic siloxane composition can be used in part or in whole as the binder in such composite, while the reinforcing materials may be in the form of fibers, particles, metal strips, wood and the like that are bonded to, or bonded together by, the binder.

Phenolic siloxane compositions of this invention can be used in the construction of composites such as fiber-reinforced plastics, in the form of moldings, sections and the like used in the automotive, mass transit, building and construction, aerospace and defense, and mining and tunnelling industries, to provide improved properties of flexibility, impact resistance, and toughness. Specific examples of such composites pipes 10 having reinforcing fibers or filaments, as illustrated in FIG. 1. Such pipes can be formed from windings of filament formed from glass, Kevlar (aromatic polyamide), carbon, graphite or the like, or combinations thereof, as described in Examples 1–3, that are bonded with a phenolic siloxane composition of this invention. As described above in Examples 1–3, the use of a phenolic siloxane composition of this invention to form filament wound pipes provide improved hoop stress and impact resistance over pipe formed from an unmodified phenolic resin.

Figure 2:
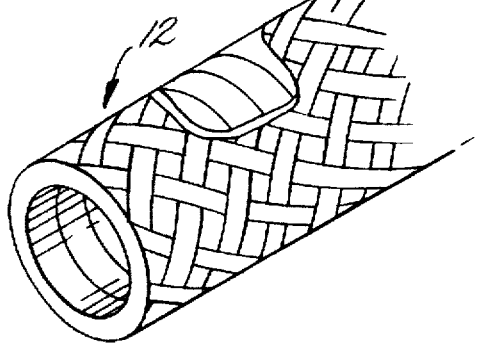
FIG. 2 is an isometric view of a filament reinforced steel pipe filament bonded with a phenolic siloxane composition prepared according to principles of this invention.

The phenolic siloxane composition can also be used in the construction of filament-reinforced steel pipe 12, such as that illustrated in FIG. 2, that is formed from a combination of steel windings and filament windings bonded with a phenolic siloxane composition of this invention.

Figure 3:
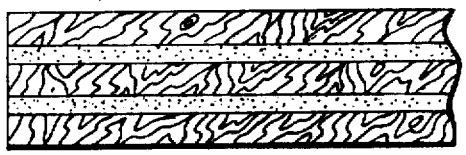
FIG. 3 is a cross-sectional side elevation of a wood composite board comprising a phenolic siloxane composition binder prepared according to principles of this invention.

As another example, phenolic siloxane compositions of this invention can be used as a binder in building board applications, such as in the construction of wood composite board 14 such as plywood, particle board, and waferboard/oriented strandboard, as illustrated in FIG. 3, to provide improved flexibility and moisture resistance.

Figure 4:
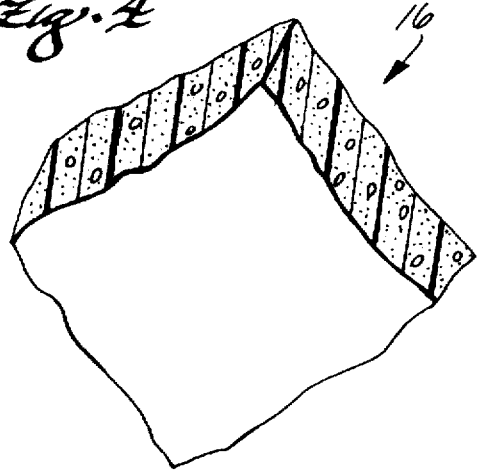
FIG. 4 is an isometric view of a piece of foam comprising a phenolic siloxane composition prepared according to principles of this invention.

As another example, phenolic siloxane compositions of this invention can be used in the production of foam 16, as illustrated in FIG. 4, to improve resiliency and water resistance. Such a foam can be made from the following four components: (1) the phenolic siloxane composition; (2) a blowing agent; (3) a cell control agent/surfactant; and (4) an acid hardener/catalyst. The surfactant is often incorporated into the resin, thus reducing the number of ingredients to be mixed when foaming to three. Chemically, the foaming process depends on an exothermic reaction between the phenolic siloxane composition and acid hardener. The heat evolved boils the volatile blowing agent (e.g., Freon or pentane) which has been dispersed in the form of fine droplets within the phenolic siloxane composition. The phenolic siloxane composition is thus blown into a foam, which, on the completion of its rise, cures into a rigid thermoset material. Such foams are used for insulation where fire retardency is also required, i.e., in mass transit cars, commercial aircraft, and the like. Foam made from a phenolic siloxane composition displays enhanced resiliency and flexibility, thereby facilitating installation of the foam without breakage.

Figure 5A:
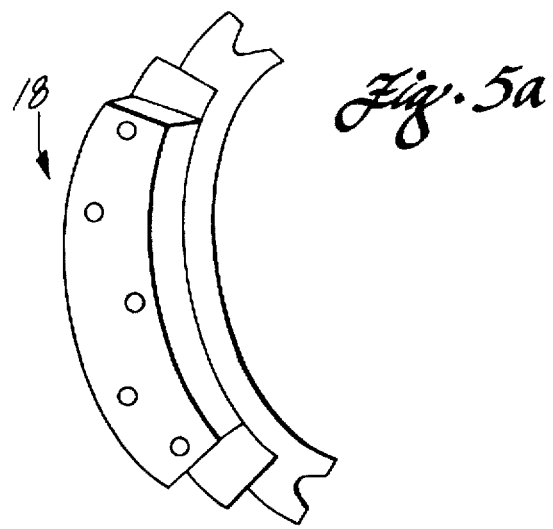
FIG. 5a is an isometric view of a brake lining comprising a phenolic siloxane composition prepared according to principles of this invention.
Figure 5B:
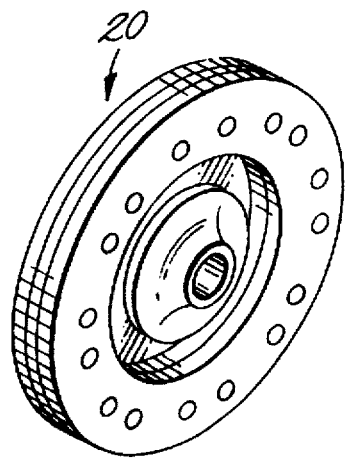
FIG. 5b is an isometric view of a clutch lining comprising a phenolic siloxane composition prepared according to principles of this invention.

As another example, phenolic siloxane compositions of this invention can be used as a binder in the construction of friction material composites, such as brake linings 18 for brake shoes and pads for automobiles and the like, as illustrated in FIG. 5a, and clutch linings 20 for clutch discs used in automobiles and the like, as illustrated in FIG. 5b. In such applications, use of the phenolic siloxane compositions provides enhanced toughness and impact resistance.

As another example, phenolic siloxane compositions of this invention can be used with natural rubber and a wide range of synthetic rubbers to act as a rubber reinforcing agent in such applications as cements, adhesives, conveyer belting, hoses, and footwear. Use of a phenolic siloxane composition enhances the flexibility and toughness, and reduces the moisture content of such materials.

As another example, phenolic siloxane compositions of this invention can be used alone or blended together with other materials to form wash primers, industrial coatings, paints and/or varnishes, having properties of improved coatability, flexibility, impact strength, toughness, and reduced moisture content when compared to conventional non-siloxane containing phenolic resins.

As another example, phenolic siloxane compositions of this invention can be used as a binder in the production of felt insulation, such as upholstery padding, mattress components, cushioning material for packaging material, and automotive padding, and thermal insulation, such as glass and mineral fibers. Use of a phenolic siloxane composition in such applications provide properties of enhanced flexibility, thereby facilitating installation of such insulation without fear of breakage or significant changes in fire retardency.

Figure 6:
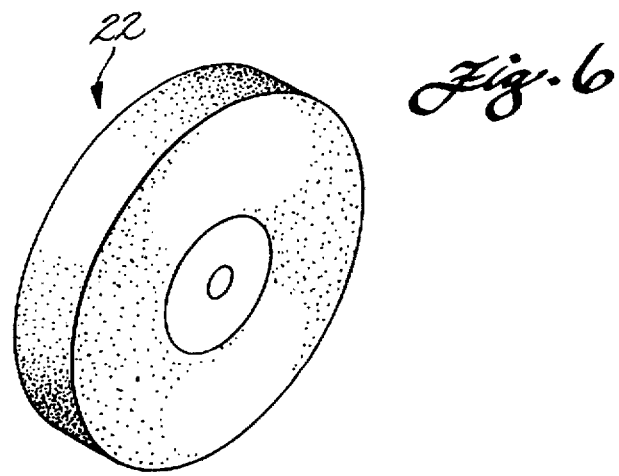
FIG. 6 is an isometric view of an abrasive grinding wheel comprising a phenolic siloxane composition binder prepared according to principles of this invention.

As another example, phenolic siloxane compositions of this invention can be used as binders in the manufacture of bonded abrasives, such as grinding wheels 22, cut-off wheels and the like, as illustrated in FIG. 6, and coated abrasives, such as abrasive papers, cloths, and discs. Use of a phenolic siloxane composition in such applications provides improved properties such as impact resistance and toughness.

As another example, phenolic siloxane compositions of this invention can be used as binders for high quality silica sands in the manufacture of cores and molds for casting a number of metals. Use of a phenolic siloxane composition in such application provides cores and molds having enhanced properties of toughness, flexibility, impact resistance, and reduced moisture content.

For example, phenolic siloxane compositions of this invention can be used in the manufacture of electrical, mechanical, and decorative laminates comprising layers of phenolic siloxane composition-coated substrates bonded together by means of heat and pressure. Use of a phenolic siloxane composition in such application provides physical properties of enhanced impact resistance, flexibility and toughness, and reduced moisture content.

Although but limited embodiments of phenolic siloxane compositions have been described herein, many modifications and variations will be apparent to those skilled in the art. Accordingly, it is to be understood that, within the scope of the appended claims, phenolic siloxane compositions according to principles of this invention may be prepared other than as specifically described herein.

What is claimed is:

1. A phenolic siloxane composition comprising an IPN of a phenolic polymer having Si—O groups in its backbone and a siloxane polymer.

2. A composite having a resin component comprising the phenolic siloxane composition prepared according to claim 1.

3. A phenolic siloxane composition prepared by combining:
 a phenolic compound selected from the group consisting of phenol and substituted phenol; with
 a silicone intermediate;
 an aldehyde; and
 an acid or base;
 wherein the silicone intermediate is combined with at least one of the phenolic compound and the aldehyde, and the other one of the phenolic compound and the aldehyde is thereafter added to form a phenolic polymer having Si—O groups in its backbone.

4. The composition as recited in claim 3 wherein the substituted phenols are selected from the group consisting of ortho-cresols, meta-cresols, para-cresols, para-tert-butyl phenol, para-octylphenol, para-nonylphenol, paraphenylphenol, bisphenol A, resorcinol, and mixtures thereof.

5. A phenolic siloxane composition as recited in claim 3 comprising in the range of from 0.75 to 0.90 moles of aldehyde, and in the range of from 0.01 to 0.3 moles silicone intermediate per one more of phenolic compound.

6. A phenolic siloxane composition as recited in claim 3 comprising in the range of from 1.2 to 3 moles of aldehyde, and in the range of from 0.01 to 0.7 moles silicone intermediate per 1 mole of phenolic compound.

7. A phenolic siloxane composition as recited in claim 3 comprising a sufficient amount of catalyst to facilitate curing the composition at ambient temperature.

8. A phenolic siloxane composition as recited in claim 7 wherein the catalyst is selected from the group consisting of organometallic compounds, amine compounds, acids, bases, and mixtures thereof.

9. A phenolic siloxane composition as recited in claim 6 comprising an IPN of phenolic polymer and siloxane polymer.

10. A phenolic siloxane composition as recited in claim 9 comprising Si—O groups in the phenolic polymer.

11. A composite having a resin component comprising a phenolic siloxane composition prepared according to any one of claims 7, 9 or 10.

12. A phenolic siloxane composition prepared by combining:
 a phenolic compound selected from the group consisting of phenol and substituted phenol, with a silicone intermediate and thereafter adding;
 an aldehyde;
 an acid or base; and
 a sufficient amount of catalyst to form a phenolic polymer having Si—O groups in its backbone, and a siloxane polymer, the phenolic polymer and siloxane polymer forming a thermoset IPN, the catalyst being selected from the group consisting of organometallic compounds, amine compounds, acids, bases, and mixtures thereof.

13. The composition as recited in claim 12 wherein the substituted phenols are selected from the group consisting of ortho-cresols, meta-cresols, para-cresols, para-tert-butyl phenol, para-octylphenol, para-nonylphenol, paraphenylphenol, bisphenol A, resorcinol, and mixtures thereof.

14. A composition as recited in claim 12 wherein the catalyst is a mixture of an organometallic compound and an amine compound, and wherein the organometallic compound is an organotin compound having the formula

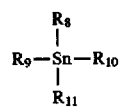

where $R_8$, $R_9$, $R_{10}$ and $R_{11}$ are each selected from the group consisting of alkyl, aryl, aryloxy, and alkoxy groups having up to 11 carbon atoms, and where any two of $R_8$, $R_9$, $R_{10}$ and $R_{11}$ are additionally selected from a group consisting of inorganic atoms consisting of halogen, sulfur and oxygen.

15. A composition as recited in claim 14 wherein the amine compound has the formula

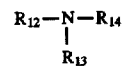

where $R_{12}$ and $R_{13}$ are each selected from the group consisting of hydrogen, aryl and alkyl groups having up to twelve carbon atoms, and where $R_{14}$ is selected from the group consisting of alkyl, aryl and hydroxyalkyl groups having up to 12 carbon atoms.

16. A composite having a resin component comprising the composition prepared according to claim 12.

17. A phenolic siloxane composition prepared by combining:
 a phenolic resole resin;
 a silicone intermediate; and
 a sufficient amount of catalyst to facilitate forming a thermoset IPN of phenolic polymer and siloxane polymer, the phenolic polymer having Si—O groups in its backbone.

18. A composition as recited in claim 17 comprising in the range of from 65 to 99.5 percent by weight of phenolic resole resin based on the total composition.

19. A composition as recited in claim 17 comprising silicone intermediate in the range of from 0.5 to 35 percent by weight of the total composition.

20. A composition as recited in claim 17 wherein the catalyst is selected from the group consisting of organometallic compounds, amine compounds, acids, bases and mixtures thereof.

21. A composition as recited in claim 20 wherein the catalyst is a mixture of an organometallic compound and an amine compound.

22. A composition as recited in claim 21 wherein the organometallic compound is an organotin compound having the formula

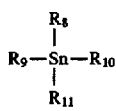

where $R_8$, $R_9$, $R_{10}$ and $R_{11}$ are each selected from the group consisting of alkyl, aryl, aryloxy, and alkoxy groups having up to 11 carbon atoms, and where any two of $R_8$, $R_9$, $R_{10}$ and $R_{11}$ are additionally selected from a group consisting of inorganic atoms consisting of halogen, sulfur and oxygen.

23. A composition as recited in any one of claims 21 or 22 wherein the amine compound has the formula

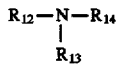

where $R_{12}$ and $R_{13}$ are each selected from the group consisting of hydrogen, aryl and alkyl groups having up to twelve carbon atoms, and where $R_{14}$ is selected from the group consisting of alkyl, aryl and hydroxyalkyl groups having up to 12 carbon atoms.

24. A composition as recited in claim 20 comprising catalyst in the range of from 5 to 25 percent by weight of the total composition.

25. A composite having a resin component comprising the composition prepared according to claim 17.

26. A phenolic siloxane thermoset composition prepared by combining:
  in the range of from 65 to 99.5 percent by weight of phenolic resole resin based on the total composition; with
  a silicone intermediate in the absence of a solvent to form a phenolic polymer having Si—O groups in its backbone; and adding
  a sufficient amount of catalyst to the silicone intermediate and phenolic resole resin combination facilitate processing and curing the composition at temperatures below 100° C., wherein the catalyst comprises an organometallic compound and an amine compound.

27. A composition as recited in claim 26 comprising silicone intermediate in the range of from 0.5 to 35 percent by weight of the total composition.

28. A composition as recited in claim 26 comprising catalyst up to 10 percent by weight of the total composition.

29. A composite having a resin component comprising the composition prepared according to claim 26.

30. A phenolic siloxane composition prepared by combining:
  a phenolic novolac resin;
  a formaldehyde donor that reacts with the phenolic novolac resin to form a phenolic polymer;
  a silicone intermediate that forms a siloxane polymer and that introduces siloxane groups into the phenolic polymer; and
  a sufficient amount of catylist to facilitate forming a thermostat IPN of the phenolic polymer and siloxane polymer.

31. A composition as recited in claim 30 comprising silicone intermediate in the range of from 0.5 to 35 percent by weight of the total composition.

32. A composition as recited in claim 30 wherein the catalyst is selected from the group consisting of organometallic compounds, amine compounds, acids, bases and mixtures thereof.

33. A composition as recited in claim 32 wherein the catalyst is a mixture of an organometallic compound and an amine compound.

34. A composition as recited in claim 33 wherein the organometallic compound is an organotin compound having the formula

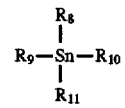

where $R_8$, $R_9$, $R_{10}$ and $R_{11}$ are each selected from the group consisting of alkyl, aryl, aryloxy, and alkoxy groups having up to 11 carbon atoms, and where any two of $R_8$, $R_9$, $R_{10}$ and $R_{11}$ are additionally selected from a group consisting of inorganic atoms consisting of halogen, sulfur and oxygen.

35. A composition as recited in any one of claims 33 or 37 wherein the amine compound has the formula

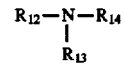

where $R_{12}$ and $R_{13}$ are each selected from the group consisting of hydrogen, aryl and alkyl groups having up to twelve carbon atoms, and where $R_{14}$ is selected from the group consisting of alkyl, aryl and hydroxyalkyl groups having up to 12 carbon atoms.

36. A composition as recited in claim 30 comprising catalyst in the range of from 5 to 25 percent by weight of the total composition.

37. A composite having a resin component comprising the composition prepared according to claim 30.

38. A method for forming a phenolic siloxane composition comprising the steps of:
  combining a phenol ingredient, an aldehyde ingredient, and a silicone intermediate ingredient in a predetermined sequence;
  reacting the ingredients to form phenolic prepolymers, siloxane prepolymers, and to introduce Si—O groups into the backbone of the phenolic prepolymers; and
  curing the reacted ingredients.

39. A method as recited in claim 38 comprising combining a sufficient amount of catalyst to the mixture to facilitate crosslinking.

40. A method as recited in claim 39 comprising selecting a catalyst from the group consisting of organometallic compounds, amine compounds, acids, bases and mixtures thereof.

41. A method for forming a phenolic siloxane composition comprising the steps of:
  combining a phenolic resole resin and a silicone intermediate to form a mixture;
  reacting the mixture in the absence of a solvent to form a mixture including a phenolic polymer having siloxane groups in its backbone; and
  adding a sufficient amount of catalyst comprising an organometallic compound and an amine compound to the mixture to facilitate cure.

42. A method as recited in claim 41 comprising adding a sufficient amount of catalyst to facilitate curing the mixture at a temperature below 100° C.

43. A method for forming a phenolic siloxane composition comprising the steps of:
  combining a phenolic novolac resin, a formaldehyde donor, and a silicone intermediate to form a mixture;

reacting the mixture in the absence of a solvent to form a phenolic polymer having siloxane groups in the polymer backbone; and adding a sufficient amount of catalyst to the mixture to facilitate cure.

44. A method as recited in claim 43 wherein the step of adding catalyst comprises adding an organometallic compound and an amine compound.

45. A method as recited in claim 43 comprising adding a sufficient amount of catalyst to facilitate curing the mixture at a temperature below 100° C.

46. A phenolic siloxane composition prepared by combining:

a phenolic compound selected from the group consisting of phenol and substituted phenol; with an aldehyde;

an acid or base; and a silicone intermediate;

wherein at least one of the phenolic compound and the aldehyde is combined with the silicone intermediate to form a mixture, and the other of the phenolic compound and the aldehyde is added to the mixture to form a siloxane polymer and a phenolic polymer that has Si—O groups in its backbone, the phenolic polymer and siloxane polymer forming an IPN.

47. The composition as recited in claim 46 wherein the substituted phenols are selected from the group consisting of ortho-cresols, meta-cresols, para-cresols, para-tert-butyl phenol, para-octylphenol, para-nonylphenol, paraphenylphenol, bisphenol A, resorcinol, and mixtures thereof.

48. A phenolic siloxane thermoset composition prepared by combining:

a formaldehyde donor;

in the range of from 50 to 95 percent by weight of phenolic novolac resin based on the total composition, the phenolic novolac resin reacting with the formaldehyde donor to form a phenolic polymer;

a silicone intermediate that forms a siloxane polymer and that introduces siloxane groups into the phenolic polymer; and a sufficient amount of catalyst to facilitate curing the composition at temperatures below 100° C. to form an IPN of siloxane polymer and phenolic polymer.

49. A phenolic siloxane thermoset composition prepared by combining:

in the range of from 65 to 99.5 percent by weight of phenolic resole resin based on the total composition, the phenolic resole resin forming a phenolic polymer;

a silicone intermediate that forms a siloxane polymer and that introduces siloxane groups into the phenolic polymer; and a sufficient amount of catalyst to facilitate processing and curing the composition at temperatures below 100° C. to form an IPN of siloxane polymer and phenolic polymer.

50. A method for forming a phenolic siloxane composition comprising the steps of:

combining a phenolic resole resin and a silicone intermediate to form a mixture;

reacting the mixture in the absence of a solvent to form an IPN of siloxane polymer and phenolic polymer characterized in that the phenolic polymer has siloxane groups in its backbone; and adding a sufficient amount of catalyst to the mixture to facilitate cure.

* * * * *